US012518940B2

(12) United States Patent
Ao et al.

(10) Patent No.: US 12,518,940 B2
(45) Date of Patent: Jan. 6, 2026

(54) CIRCUIT BREAKER

(71) Applicant: Chint Low Voltage Electrical Technology Co., Ltd., Shanghai (CN)

(72) Inventors: Denggui Ao, Shanghai (CN); Lijun Yan, Shanghai (CN); Dengyu Lu, Shanghai (CN); Xiaoqin Yuan, Shanghai (CN)

(73) Assignee: Chint Low Voltage Electrical Technology Co., Ltd. (CN)

( * ) Notice: Subject to any disclaimer, the term of this patent is extended or adjusted under 35 U.S.C. 154(b) by 245 days.

(21) Appl. No.: 18/557,237

(22) PCT Filed: Oct. 17, 2022

(86) PCT No.: PCT/CN2022/125579

§ 371 (c)(1),
(2) Date: Oct. 25, 2023

(87) PCT Pub. No.: WO2023/066174

PCT Pub. Date: Apr. 27, 2023

(65) Prior Publication Data

US 2024/0222059 A1 Jul. 4, 2024

(30) Foreign Application Priority Data

Oct. 20, 2021 (CN) ......................... 202111223461.1

(51) Int. Cl.
*H01H 71/10* (2006.01)
*H01H 71/02* (2006.01)
*H01H 71/74* (2006.01)

(52) U.S. Cl.
CPC ............ *H01H 71/10* (2013.01); *H01H 71/02* (2013.01); *H01H 71/74* (2013.01)

(58) Field of Classification Search
CPC ........ H01H 71/74; H01H 71/02; H01H 71/10; H01H 71/0235; H01H 71/40
See application file for complete search history.

(56) References Cited

FOREIGN PATENT DOCUMENTS

CN 1423294 A * 6/2003
CN 205376440 U 7/2016
(Continued)

OTHER PUBLICATIONS

International Search Report mailed Jan. 3, 2023 in corresponding PCT International Application No. PCT/CN2022/125579.

*Primary Examiner* — Mohamad A Musleh
(74) *Attorney, Agent, or Firm* — OSTROLENK FABER LLP

(57) ABSTRACT

A circuit breaker that includes circuit breaker poles, an operating mechanism and a tripping system. Each circuit breaker pole includes a pole housing and a contact system that includes a moving contact mechanism and a static contact. The operating mechanism drives the moving contact mechanisms. The tripping system includes groups of tripping mechanisms and an adjusting mechanism. Each group of tripping mechanisms includes a conductive plate, a magnetic yoke and an armature. The conductive plate passes through the magnetic yoke. Each circuit breaker pole has a group of tripping mechanisms. Each contact system is electrically connected to a corresponding conductive plate. Each adjusting mechanism includes a linkage rod. Each group of the tripping mechanisms includes an insulated transmission rod having one end inserted into the pole housing and connected to the armature, and another end that protrudes out of the pole housing and trips the operating mechanism.

15 Claims, 6 Drawing Sheets

(56) References Cited

FOREIGN PATENT DOCUMENTS

| | | | | |
|---|---|---|---|---|
| CN | 213583664 U | | 6/2021 | |
| CN | 217061937 U | | 7/2022 | |
| EP | 2743958 A1 | | 6/2014 | |
| FR | 2473222 A1 | * | 7/1981 | ............ H01H 73/50 |
| JP | H09147722 A | | 6/1997 | |

* cited by examiner

CIRCUIT BREAKER

CROSS-REFERENCE TO RELATED APPLICATIONS

The present application is a 35 U.S.C. §§ 371 national stage application of International Application No. PCT/CN2022/125579, filed Oct. 17, 2022, which claims priority to Chinese Patent Application No. 202111223461.1, filed Oct. 20, 2021, the contents of which are incorporated herein by reference.

TECHNICAL FIELD

The present invention relates to the field of low-voltage electrical appliances, and more particularly, to a circuit breaker.

BACKGROUND ART

A molded case circuit breaker is a commonly used protection switch appliance in-a low-voltage circuit, which has a short-circuit protection function, an overload protection function, etc. The molded case circuit breaker generally includes a circuit breaker shell in which a circuit breaker pole, an operating mechanism and a thermomagnetic tripping system are disposed, wherein the circuit breaker pole includes an arc extinguishing chamber and a contact system, and the thermomagnetic tripping system includes a thermomagnetic tripping mechanism and an adjusting mechanism. In the thermomagnetic tripping system of the existing molded case circuit breaker, an armature directly strikes a linkage rod. Since a rotating shaft of the linkage rod is made of metal, after a short-circuit current flows through a conductive plate and the armature is enabled to rotate and contact a magnetic yoke, there is a large current on the armature, which is easy to cause breakdown between different circuit breaker poles through the rotating shaft of the linkage rod.

SUMMARY OF THE INVENTION

An objective of the present invention is to overcome the defects of the prior art and provide a circuit breaker with good insulativity and high safety.

In order to achieve the above object, the technical scheme adopted in the present invention is as follows:

A circuit breaker, comprising a plurality of circuit breaker poles arranged side by side, an operating mechanism and a tripping system, wherein each of the circuit breaker poles comprises a pole housing and a contact system disposed in the pole housing, and the contact system comprises a moving contact mechanism which is disposed rotatably and a static contact which cooperates with the moving contact mechanism; the operating mechanism is disposed outside each circuit breaker pole and is in driving connection to the moving contact mechanism of each circuit breaker pole; the tripping system comprises a plurality of groups of tripping mechanisms and an adjusting mechanism; each group of tripping mechanism comprises a conductive plate, as well as a magnetic yoke and an armature which are used cooperatively, wherein the conductive plate passes through the middle of the magnetic yoke; each circuit breaker pole is provided with a group of tripping mechanism therein, and the contact system of each circuit breaker pole is electrically connected to the corresponding conductive plate; the adjusting mechanism comprises a linkage rod which is disposed rotatably around its own axis; and each group of tripping mechanism further comprises an insulated transmission rod which is disposed rotatably, wherein one end of the insulated transmission rod is inserted into the pole housing and is in driving fit with the armature, and the other end of the insulated transmission rod protrudes out of the pole housing and is in driving fit with the operating mechanism through the linkage rod to drive the operating mechanism to trip.

Further, each group of the tripping mechanism further comprises a bimetallic strip and a bimetal transmission rod; two ends of the bimetallic strip are a first bimetal end and a second bimetal end, respectively; the first bimetal end is electrically connected, to the conductive plate, and the second bimetal end is connected to one end of the bimetal transmission rod; and the other end of the bimetal transmission rod passes through the pole housing and is then in driving fit with the operating mechanism through the linkage rod to drive the operating mechanism to trip.

Further, the adjusting mechanism further comprises a linkage rod metal shaft, wherein a linkage rod shaft hole which extends in an axial direction of the linkage rod is formed in the middle of the linkage rod, the linkage rod metal shaft is inserted in the linkage rod shaft hole, and the linkage rod is disposed rotatably through the linkage rod metal shaft.

Further, the linkage rod comprises a linkage rod-main rod which rotates around its own axis, as well as a bimetal cooperating arm, an armature cooperating arm and a linkage rod transmission arm which are respectively disposed on the linkage rod-main rod, wherein one ends of the insulated transmission rod and the bimetal transmission rod, which protrude out of the pole housing, cooperate with the armature cooperating arm and the bimetal cooperating arm respectively to drive the linkage rod to rotate; and the linkage rod is in driving fit with the operating mechanism through the linkage rod transmission arm to drive the operating mechanism to trip.

Further, the adjusting mechanism also comprises a bimetal adjusting structure, and the linkage rod is capable of reciprocating along an axis direction of the linkage rod-main rod; the bimetal transmission rod comprises an adjusting slope disposed at its free end, and the bimetal cooperating arm comprises a bimetal cooperating arm driven portion which protrudes toward the adjusting slope and is in driving fit with the adjusting slope; and the bimetal adjusting structure drives the linkage rod to move along the axis direction of the linkage rod-main rod, so that the bimetal cooperating arm driven portion moves relative to the adjusting slope to adjust a spacing between the bimetal cooperating arm driven portion and the adjusting slope.

Further, the bimetal adjusting structure is a bimetal adjusting knob; the bimetal adjusting knob comprises an adjusting knob main body and an adjusting knob toggling portion disposed on a circumferential side wall of the adjusting knob main body; the bimetal adjusting knob is disposed rotatably around its axis of the adjusting knob main body; the linkage rod further comprises a linkage rod adjusting portion, and an adjusting portion slot in which the adjusting knob toggling portion is inserted is formed in the middle of the linkage rod adjusting portion; and the bimetal adjusting knob rotates, through the cooperation of the adjusting knob toggling portion and the linkage rod adjusting portion, to drive the linkage rod to move along the axis of the linkage rod-main rod.

Further, the bimetal transmission rod is of a long rod-shaped structure, which comprises a bimetal transmission rod connecting end, a bimetal transmission rod transition part and a bimetal transmission rod wedge portion which are connected in sequence, wherein the bimetal transmission rod connecting end is inserted in the pole housing and is connected to the second bimetal end, and the bimetal transmission rod wedge portion protrudes out of the pole housing and comprises the adjusting slope.

Further, each group of tripping mechanism further comprises an armature spring, and the armature spring cooperates with the armature such that the armature rotates away from the magnetic yoke; and the tripping mechanism further comprises an adjusting screw disposed on the pole housing, wherein one end of the adjusting screw cooperates with the armature, and the armature is driven by screwing the adjusting screw to rotate in a direction close to the magnetic yoke.

Further, the armature spring is a torsion spring, which comprises a spring acting end and a spring adjusting end; the adjusting mechanism further comprises a torque adjusting rod and a torque adjusting operation rod; the torque adjusting rod comprises an adjusting rod main rod, and an adjusting rod force-bearing portion and an adjusting rod force-applying arm which are disposed on the adjusting rod main rod respectively; the adjusting rod force-applying arm is in driving fit with the other end of the torsion spring; the torque adjusting operation rod is disposed rotatably around its own axis, and one end of the torque adjusting operation rod is in driving fit with the adjusting rod force-bearing portion; the torque adjusting operation rod rotates, through the adjusting rod force-bearing portion, to drive the torque adjusting rod to rotate; and the torque adjusting rod increases or decreases a force exerted by the torsion spring on the armature through the adjusting rod force-applying arm.

Further, the adjusting rod force-applying arm passes through the pole housing and then cooperates with the spring adjusting end.

Further, the adjusting rod force-bearing portion is an adjusting rod force-bearing arm disposed on the adjusting rod main rod, and the torque adjusting rod comprises an adjusting helical surface disposed on one end thereof, and the adjusting helical surface props against a free end of the adjustment rod force-bearing arm.

Further, the pole housing comprises an adjusting rod cooperating groove formed on its outside, and the adjusting rod main rod is disposed rotatably in the adjusting rod cooperating groove.

Further, the tripping mechanism further comprises an armature shaft, the middle of the armature rotates around the armature shaft, one end of the armature cooperates with the magnetic yoke, and the other end of the armature cooperates with the insulated transmission rod; and the armature spring is a torsion spring which sleeves the armature shaft.

Further, the adjusting mechanism also comprises an intermediate transmission rod which is disposed rotatably; the linkage rod transmission arm is in driving fit with one end of the intermediate transmission rod, and the other end of the intermediate transmission rod cooperates with the operating mechanism.

Further, the insulated transmission rod comprises a transmission rod connecting arm, a transmission rod cooperating plate, a transmission rod mounting portion and a transmission rod force-bearing arm which are connected in sequence; a middle of the transmission rod mounting portion is disposed rotatably on the pole housing through an insulated transmission rod shaft; the transmission rod force-bearing arm is in driving fit with the armature; and the transmission rod cooperating plate is in driving fit with the armature cooperating arm of the linkage rod.

Further, a dimension of the transmission rod cooperating plate in an axial direction of a linkage rod-main rod of the linkage rod is greater than that of the armature cooperating arm of the linkage rod in the axial direction of the linkage rod-main rod.

Further, the armature comprises an armature main plate which is opposite to and cooperates with the magnetic yoke, and an armature mounting portion and an armature driving portion which are disposed rotatably on the pole housing through the armature shaft; the armature driving portion comprises an armature driving finger extending to the insulated transmission rod; the transmission rod force-bearing arm comprises a transmission rod driven hole; and the armature driving finger is rotatably inserted in the transmission rod driven hole.

Further, the adjusting mechanism also comprises an adjusting mechanism bracket; the linkage rod and the torque adjusting rod of the adjusting mechanism are disposed rotatably on the adjusting mechanism bracket respectively; the linkage rod and the torque adjusting rod are spaced in parallel; the bimetal adjusting structure of the adjusting mechanism and the torque adjusting operation rod are disposed on the adjusting mechanism bracket, respectively; an axial direction of the bimetal adjusting structure and an axial direction of the torque adjusting operation rod are perpendicular to an axial direction of the linkage rod and the torque adjusting rod, respectively; and the intermediate transmission rod of the adjusting mechanism is rotatably disposed on the adjusting mechanism bracket, and the intermediate transmission rod and the operating mechanism are located on the same side of the adjusting mechanism bracket.

According to the circuit breaker of the present invention, the tripping mechanisms of the tripping systems are respectively disposed in the pole housings of the corresponding circuit breaker poles, and the armature of each tripping mechanism cooperates with the linkage rod through the insulated transmission rod, which increases an insulation gap and a creepage distance between the circuit breaker pole and the linkage rod, thereby avoiding the interphase breakdown between the circuit breaker poles when the armatures of the tripping mechanisms share the linkage rod directly and conducing to improving the insulation performance of the circuit breaker. In addition, the bimetallic strip is in driving fit with the linkage rod through the bimetal transmission rod, which, is also conducive to increasing the insulation gap and creepage distance between the circuit breaker pole and the linkage rod and avoiding the interphase breakdown between the circuit breaker poles when the bimetallic strips of the tripping mechanisms share the linkage rod directly, and is thus conducive to improving the insulation performance of the circuit breaker.

DETAILED DESCRIPTION OF THE PREFERRED EMBODIMENTS

Figure 1:
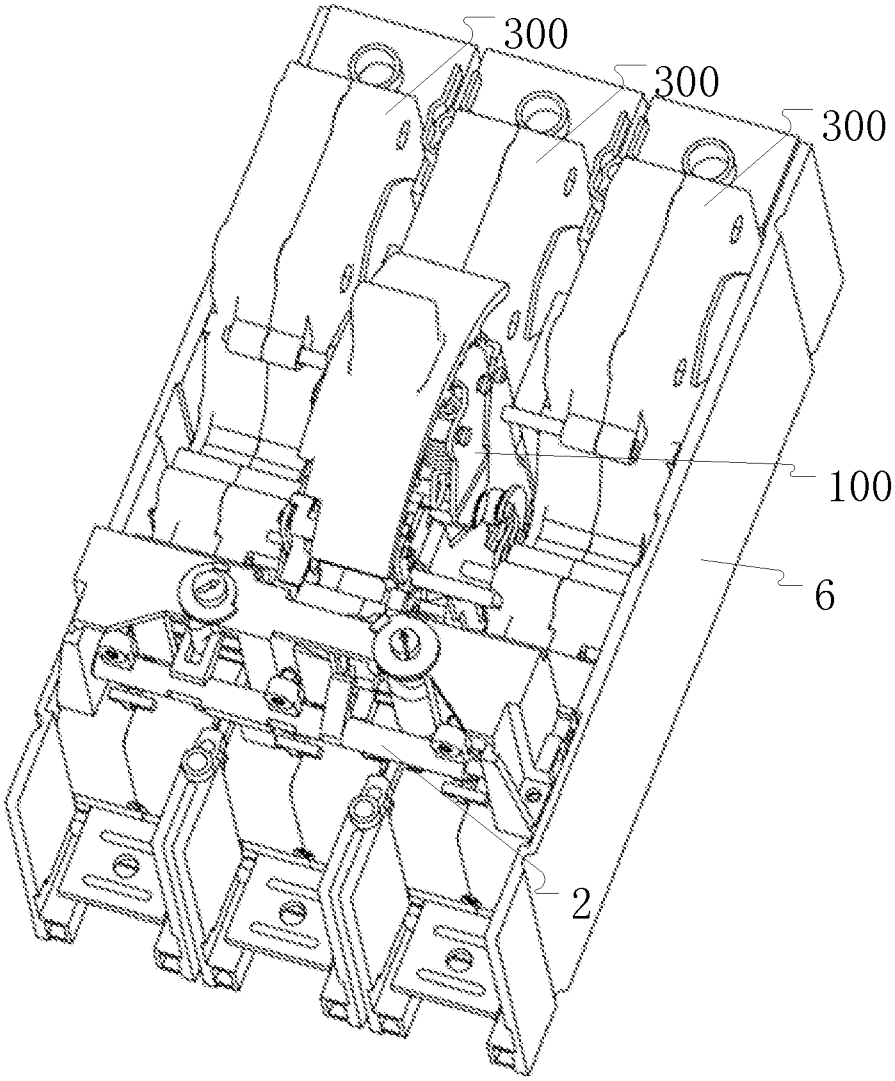
FIG. 1 is a schematic structural diagram of a circuit breaker of the present invention.

The specific implementation of a circuit breaker of the present invention will be further described below with reference to the embodiments given in FIGS. 1 to 13. The circuit breaker of the present invention is not limited to the description of the following embodiments.

As shown in FIGS. 1 to 4, the circuit breaker of the present invention includes a plurality of circuit breaker poles 300 arranged side by side, an operating mechanism 100 and a tripping system, wherein each of the circuit breaker poles 300 includes a pole housing 31-32 and a contact system disposed in the pole housing 31-32, and the contact system includes a moving contact mechanism rotatably disposed in the pole housing 31-32 and a static contact 34 which cooperates with the moving contact mechanism; the operating mechanism 100 is disposed outside each circuit breaker pole 300 and is in driving connection to the moving contact mechanism of each circuit breaker pole 300 so as to drive each circuit breaker pole 300 to make contact and break contact; the tripping system includes a plurality of groups of tripping mechanisms 1 and an adjusting mechanism 2; each group of tripping mechanism 1 includes a conductive plate 10, as well as a magnetic yoke 11 and an armature 14 which are used cooperatively, wherein the conductive plate 10 passes through the middle of the magnetic yoke 11; each circuit breaker pole 300 is provided with a group of tripping mechanism 1 therein, and the contact system of each circuit breaker pole 300 is electrically connected to the corresponding conductive plate 10; the adjusting mechanism 2 includes a linkage rod 20 which is rotatably disposed around its own axis; and each group of tripping mechanism 1 further includes an insulated transmission rod 17 which is rotatably disposed, wherein one end of the insulated transmission rod 17 is inserted into the pole housing 31-32 and is in driving fit with the armature 14, and the other end of the insulated transmission rod 17 protrudes out of the pole housing 31-32 and is in driving fit with the operating mechanism 100 through the linkage rod 20 to drive the operating mechanism 100 to trip.

According to the circuit breaker of the present invention, the tripping mechanisms of the tripping systems are respectively disposed in the pole housings of the corresponding circuit breaker poles, and the armature of each tripping mechanism cooperates with the linkage rod through the insulated transmission rod to avoid the interphase breakdown between the circuit breaker poles when the armatures of the tripping mechanisms share the linkage rod directly, increasing an insulation gap and a creepage distance between the circuit breaker pole and the linkage rod, it is conducive to improving the insulation performance of the circuit breaker.

As shown in FIGS. 3-6, a rotation axis of the insulated transmission rod 17 is parallel to a rotation axis of the armature 14.

As shown in FIG. 1, the operating mechanism 100 is disposed to span outside one of the circuit breaker poles 300 and is in driving connection to the moving contact mechanism of each circuit breaker pole 300 for realization of synchronous make-contact or break-contact action of each circuit breaker pole 300; and the adjusting mechanism 2 spans over the respective circuit breaker poles 300 in a direction along which the respective circuit breaker poles 300 are arranged side by side, and cooperates the tripping mechanisms 1 respectively.

Specifically, as shown in FIG. 1, the circuit breaker of the present invention includes three circuit breaker poles 300, the operating mechanism 100 spans over the middle circuit breaker pole 300, and the adjusting mechanism 2 spans over the three circuit breaker poles 300. The number of the circuit breaker poles 300 may be adjusted according to actual needs. For example, when the circuit breaker of the present invention is used in a four-phase circuit, the number of the circuit breaker poles 300 is 4. For example, when the circuit breaker of the present invention is used in a two-phase circuit, the number of the circuit breaker poles 300 is 2.

Figure 8:
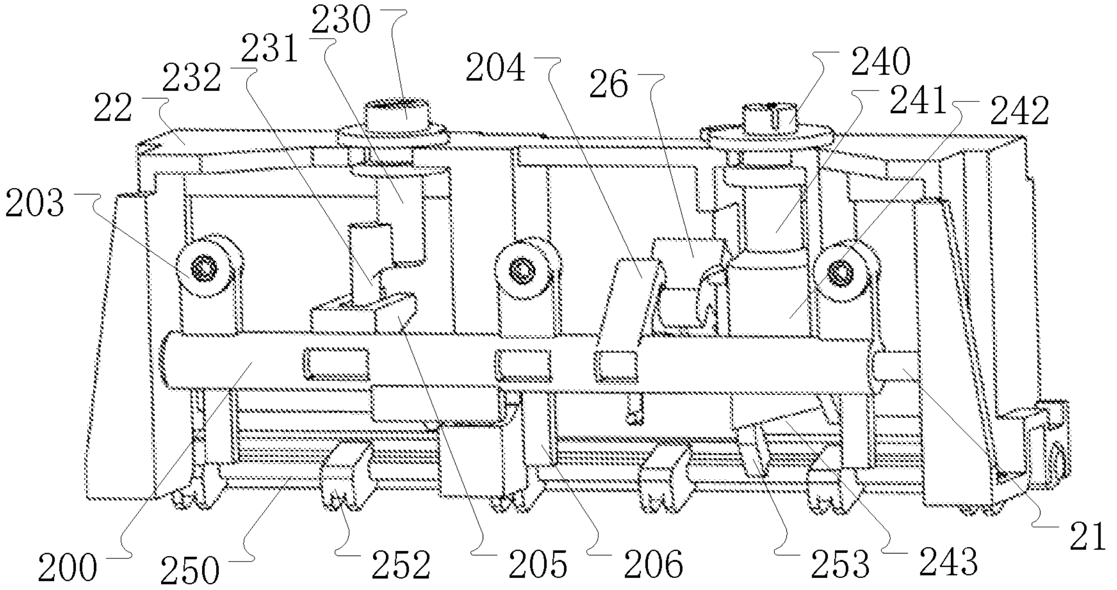
FIG. 8 is a schematic structural diagram of the operating mechanism of the present invention from a prospective.

As shown in FIG. 8, the adjusting mechanism 2 further includes a linkage rod metal shaft 21, wherein a linkage rod shaft hole which extends in an axial direction of the linkage rod 20 is formed in the middle of the linkage rod 20, the linkage rod metal shaft 21 is inserted in the linkage rod shaft hole, and the linkage rod 20 is rotatably disposed through the linkage rod metal shaft 21; and the linkage rod 20 may further move in an extension direction of the linkage rod meal shaft 21. Further, the linkage rod 20 is disposed rotatably on an adjusting mechanism bracket 22 of the adjusting mechanism 2 through the linkage rod metal shaft 21.

As other embodiments, the linkage rod 20 and the linkage rod metal shaft 21 are of an integrated structure. A section of linkage rod metal shaft 21 is respectively disposed at both ends of the linkage rod 20, and two sections of the linkage rod metal shafts 21 are rotatably disposed on the adjusting mechanism bracket 22, respectively. When the linkage rod 20 moves along an axis of the linkage rod-main rod 200, the linkage rod metal shaft 21 slides relative to the adjusting mechanism bracket 22.

In the circuit breaker of the present invention, the armature of the tripping mechanism corresponding to each circuit breaker pole is in driving fit with the linkage rod through the insulated transmission rod, which is conducive to improving the insulation gap and the creepage distance between the circuit breaker poles and avoiding the interphase breakdown between the circuit breaker poles due to the linkage rod metal shaft.

Figure 3:
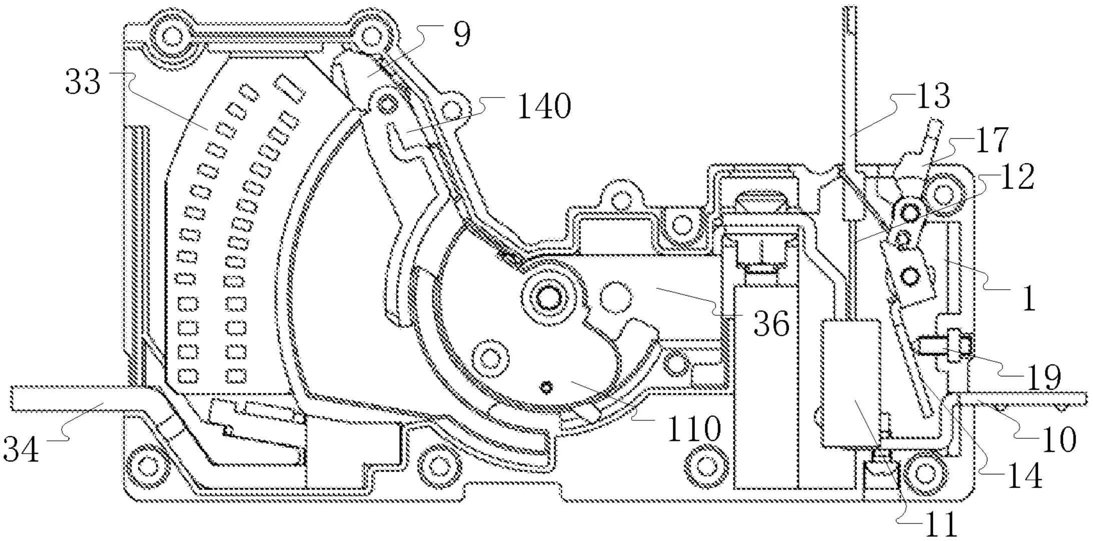
FIG. 3 is a schematic structural diagram of the circuit breaker pole of the present invention, in which an internal structure of the circuit breaker pole is shown.
Figure 4:
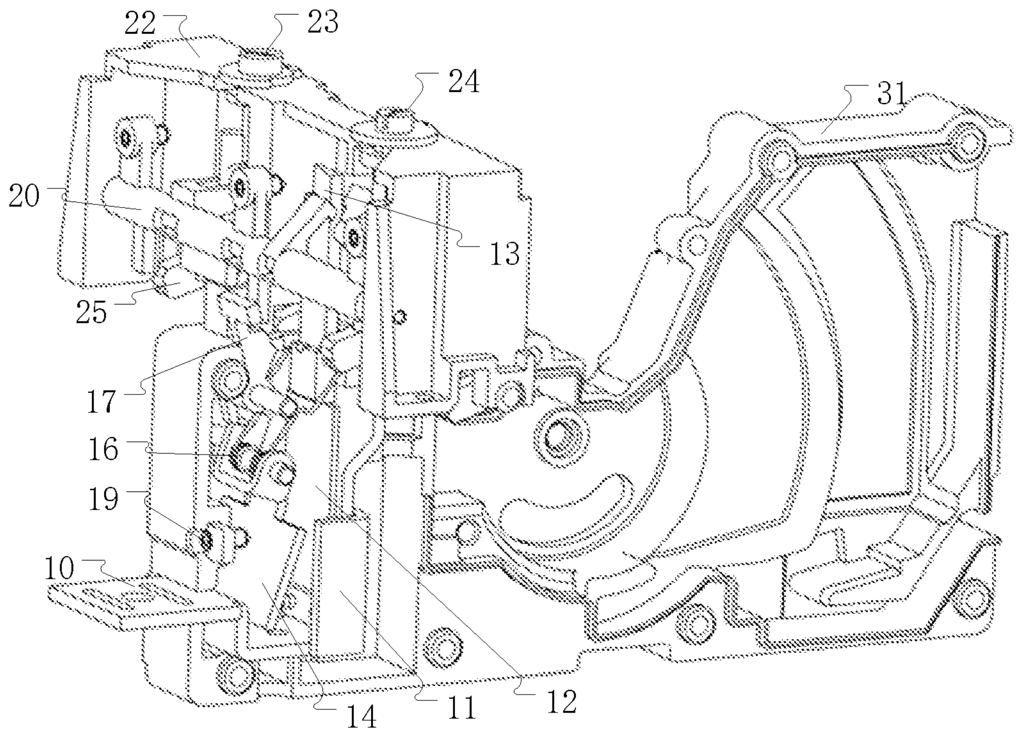
FIG. 4 is a schematic diagram of an assembled structure of a thermomagnetic tripping system and a pole housing of the present invention.
Figure 5:
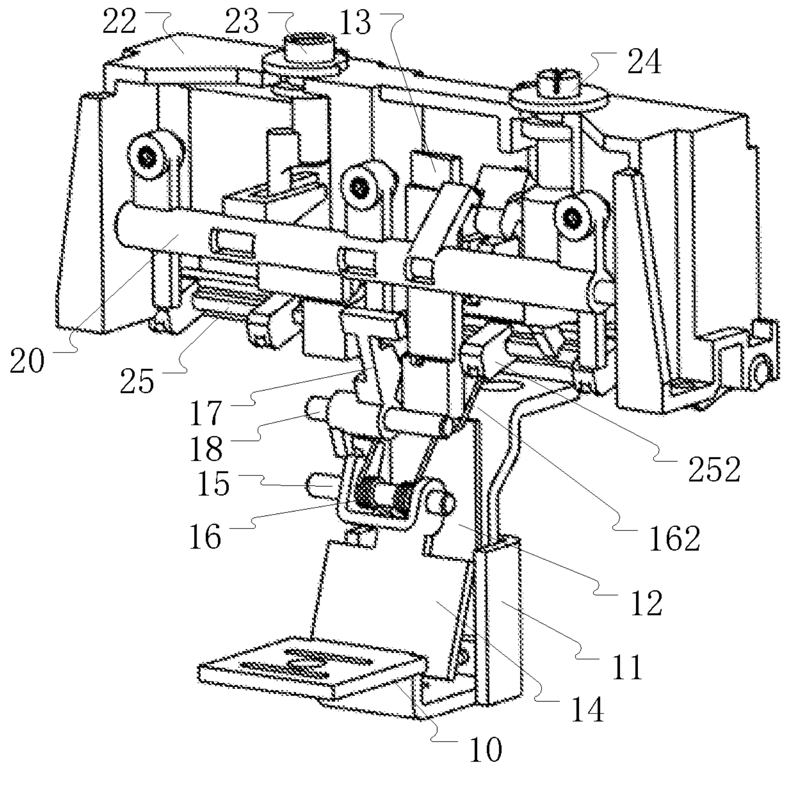
FIG. 5 is a schematic structural diagram of the thermomagnetic tripping system of the present invention.

As shown in FIGS. 3-5, the tripping mechanism 1 further includes a bimetallic strip 12 and a bimetal transmission rod 13; two ends of the bimetallic strip 12 are a first bimetal end and a second bimetal end, respectively; the first bimetal end is electrically connected to the conductive plate 10, and the second bimetal end is connected to one end of the bimetal transmission rod 13; and the other end of the bimetal transmission rod 13 passes through the pole housing 31-32 and is then in driving fit with the operating mechanism 100 through the linkage rod 20 to drive the operating mechanism 100 to trip. The bimetallic strip is in driving fit with the linkage rod through the bimetal transmission rod, which is also conducive to increasing the insulation gap and creepage distance between the circuit breaker pole and the linkage rod and avoiding the interphase breakdown between the circuit breaker poles when the bimetallic strips of the tripping mechanisms share the linkage rod directly, and is thus conducive to improving the insulation performance of the circuit breaker.

As shown in FIGS. 4-5, the magnetic yoke 11 is of a U-shaped structure, wherein a bottom plate of the U-shaped structure of the magnetic yoke 11, the conductive plate 10 and the first bimetal end of the bimetallic strip 12 are overlapped and connected in sequence. The above structural design is conducive to improving the compactness of the structure of the tripping mechanisms and saving an installation space.

As shown in FIG. 1, the circuit breaker of the present invention further includes a circuit breaker shell 6; the circuit breaker poles 300, the operating mechanism 100 and the adjustment mechanism 2 of the tripping system are disposed in the circuit breaker shell 6; and the operating mechanisms 100 and the adjusting mechanism 2 are located outside the respective circuit breaker poles 300.

As shown in FIG. 3, the contact system includes a moving contact mechanism and a static contact 34 which are used cooperatively; each of the circuit breaker poles 300 further includes an arc extinguishing chamber 33, and the arc extinguishing chamber 33 and the static contact 34 are disposed at one end of the pole housing 31-32; and the moving contact mechanism is rotatably disposed in the middle of the pole housing 31-32, and the tripping mechanism 1 is disposed at the other end of the pole housing 31-32. Further, as shown in FIG. 2, the pole housing 31-32 further includes an exhaust hole 302 which matches oppositely to an air outlet of the arc extinguishing chamber 33.

Preferably, as shown in FIG. 3, each circuit breaker pole 300 further includes an electric conductor 36 disposed in the pole housing 31-32, wherein one end of the electric conductor 36 is rotatably and electrically connected to the moving contact 9 of the moving contact mechanism, and the other end of the electric conductor 36 is electrically connected to the conductive plate 10.

Figure 6:
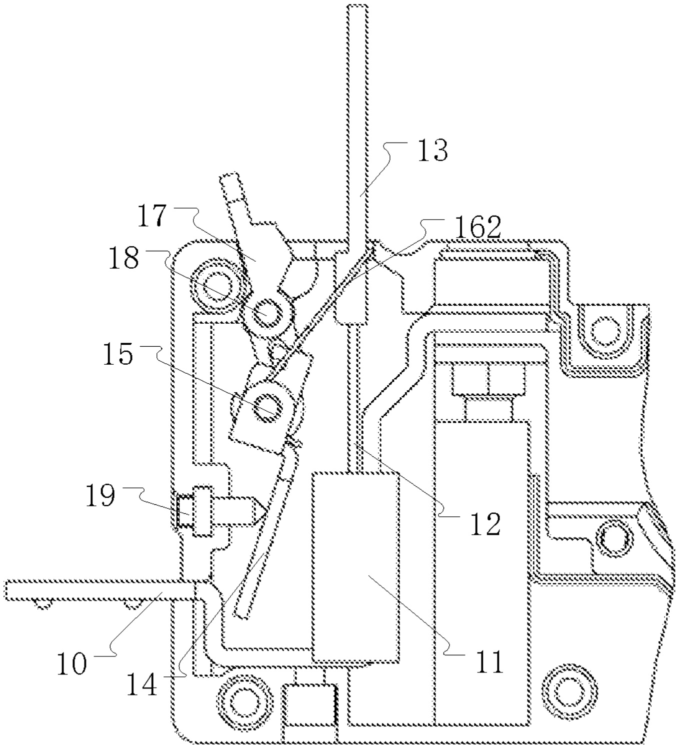
FIG. 6 is a schematic structural diagram of a thermomagnetic tripping mechanism of the present invention.
Figure 7:
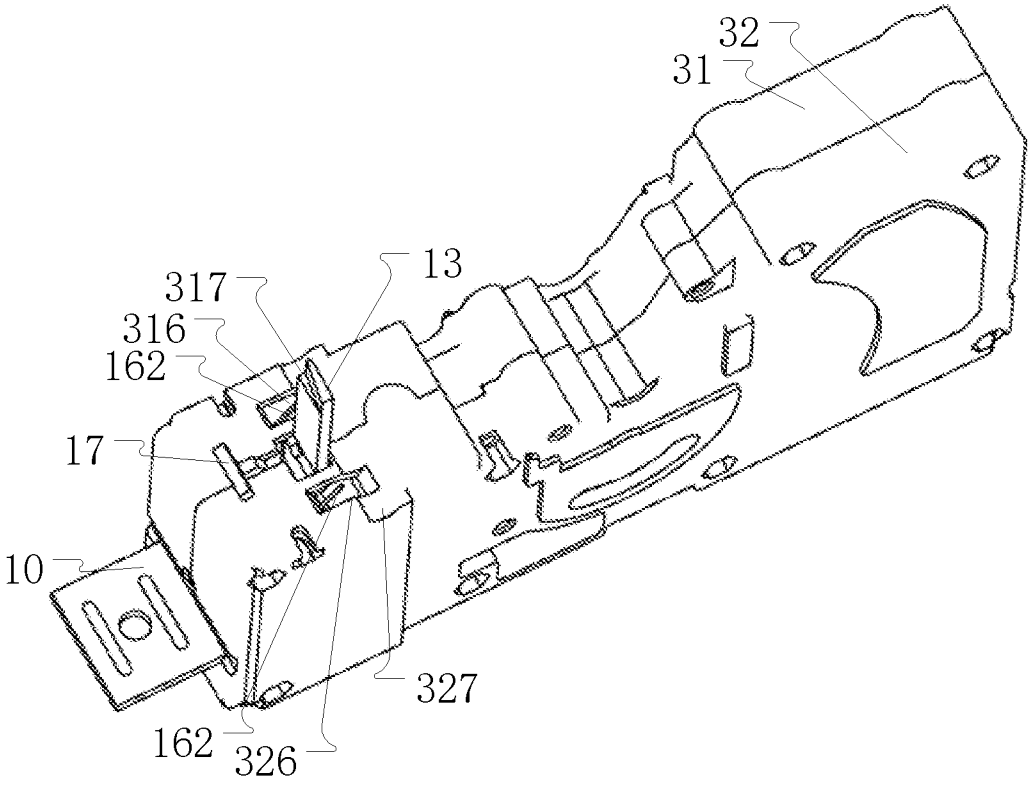
FIG. 7 is a schematic diagram of a three-dimensional structure of the circuit breaker pole of the present invention.

As shown in FIGS. 3, and 6-7, the pole housing 31-32 includes an insulated transmission rod avoidance hole through which the insulated transmission rod 17 passes, and a bimetal transmission rod avoidance hole through which the bimetal transmission rod 13 passes.

Figure 2:
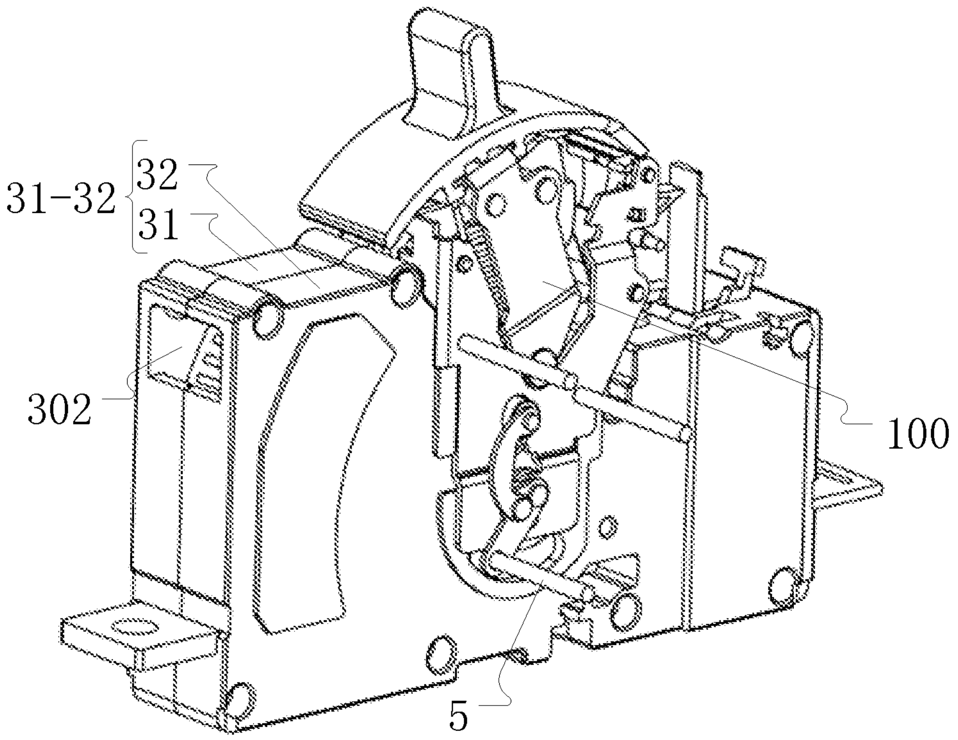
FIG. 2 is a schematic diagram of an assembled structure of an operating mechanism and a circuit breaker pole of the present invention.

As shown in FIGS. 2 and 7, the pole housing 31-32 includes a first half pole housing 31 and a second half pole housing 32 that are oppositely buckled together and are of a box-like structure as a whole; and the exhaust hole 302, the insulated transmission rod avoidance hole and the bimetal transmission rod avoidance hole are all provided at the splicing of the first half pole housing 31 and the second half pole housing 32.

Figure 9:
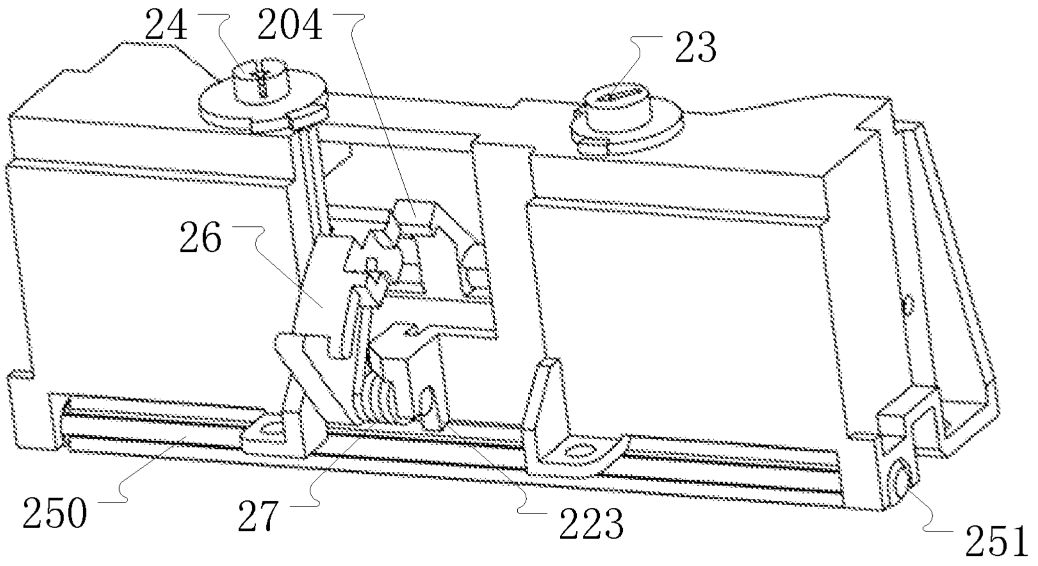
FIG. 9 is a schematic structural diagram of the operating mechanism of the present invention from another prospective.

As shown in FIGS. 4-5, and 8-9, the adjusting mechanism 2 includes a linkage rod 20. The linkage rod 20 includes a linkage rod-main rod 200 which rotates around its own axis, as well as a bimetal cooperating arm 203, an armature cooperating arm 206 and a linkage rod transmission arm 204 which are respectively disposed on the linkage rod-main rod 200, wherein one ends of the insulated transmission rod 17 and the bimetal transmission rod 13, which protrude out of the pole housing 31-32, cooperate with the armature cooperating arm 206 and the bimetal cooperating arm 203 respectively to drive the linkage rod 20 to rotate; and the linkage rod 20 is in driving fit with the operating mechanism 100 through the linkage rod transmission arm 204 to drive the operating mechanism 100 to trip. Further, as shown in FIGS. 8-9, the adjusting mechanism 2 also includes an intermediate transmission rod 26 which is rotatably disposed; and the linkage rod transmission arm 204 is in driving fit with one end of the intermediate transmission rod 26, and the other end of the intermediate transmission rod 26 cooperates with the operating mechanism 100.

Preferably, as shown in FIGS. 8-9, the adjusting mechanism 2 also includes an intermediate transmission rod spring 27 for driving the intermediate transmission rod 26 to reset; the intermediate rod spring 27 is a torsion spring which sleeves a rotating shaft of the intermediate transmission rod 26; and one end of the intermediate transmission rod spring 27 cooperates with the intermediate transmission rod 26, and the other end of the intermediate transmission rod spring 27 cooperates with the adjusting mechanism bracket 22 of the adjusting mechanism 2.

Specifically, the intermediate transmission rod 26 cooperates with a re-buckle of the operating mechanism 100 to prevent the re-buckle from rotating; and in the event of a short-current fault or an overload fault in the circuit breaker, the tripping system drives the intermediate transmission rod 26 to rotate to release its fit with the re-buckle, the re-buckle rotates to release its fit with a lock buckle such that the lock buckle releases the locking fit with a jump buckle, and the operating mechanism 100 finally trips. Alternatively, the intermediate transmission rod 26 is in driving fit with the jump buckle of the operating mechanism 100 directly; and in the event of a short-current fault or an overload fault in the circuit breaker, the tripping system drives the intermediate transmission rod 26 rotate, and the intermediate transmission rod 26 drives the jump buckle to rotate to release its locking fit with the lock buckle, so the operating mechanism 100 trips. The operating mechanism 100 may be implemented by the prior art, and only needs to make structural adjustments adapted to the tripping system of the present application, which will not be expanded in detail herein.

Preferably, as shown in FIGS. 3-5, the insulated transmission rod 17 is disposed rotatably on the pole housing 31-32 through an insulated transmission rod shaft 18. Further, the insulated transmission rod shaft 18 is located inside the pole housing 31-32.

As other embodiments, the insulated transmission rod 17 and the armature transmission shaft 18 may also be of an integrated structure.

Figure 12:
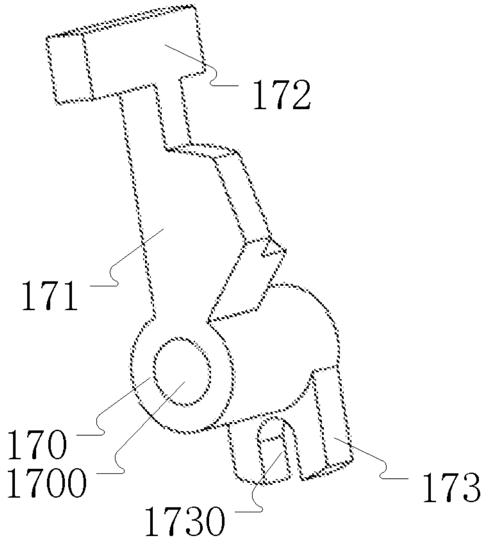
FIG. 12 is a schematic structural diagram of an insulated transmission rod of the present invention.

As shown in FIG. 12, an embodiment of the insulated transmission rod 17 is shown: the insulated transmission rod 17 includes a transmission rod connecting arm 171, a transmission rod cooperating plate 172, a transmission rod mounting portion 170 and a transmission rod force-bearing arm 173 which are connected in sequence; a transmission rod shaft hole 1700 which cooperates with the insulated transmission rod shaft 18 is formed in the middle of the transmission rod mounting portion 170; the transmission rod force-bearing arm 173 is provided with a transmission rod driven hole 1730 which cooperates with an armature driving finger of the armature 14; and the transmission rod cooperating plate 172 cooperates with the armature cooperating arm 206 of the linkage rod 20. Further, as shown in FIGS. 4-5, a dimension of the transmission rod cooperating plate 172 in the axial direction of the linkage rod-main rod 200 is greater than that of the armature cooperating arm 206 of the linkage rod 20 in the axial direction of the linkage rod-main rod 200, thereby preventing the transmission rod cooperating plate 172 from releasing fit from the armature cooperating arm 206 when the linkage rod 20 moves in the axial direction of the linkage rod-main rod 200.

Preferably, as shown in FIGS. 3-6, the armature 14 is disposed rotatably on the pole housing 31-32 through an armature shaft 15.

As other embodiments, the armature 14 and the armature shaft 15 may also be of an integrated structure.

As shown in FIGS. 4-5, an embodiment of the armature 14 is shown: the armature 14 includes an armature main plate which is opposite to and cooperates with the magnetic yoke 11, and an armature mounting portion which is disposed rotatably on the armature shaft 15 and an armature driving portion; the armature driving portion includes an armature driving finger extending toward the insulated transmission rod 17; and the armature driving finger is inserted in the transmission rod driven hole 1730 to drive the insulated transmission rod 17 to rotate. Further, an armature shaft hole which cooperates with the armature shaft 15 is formed in the middle of the armature mounting portion, and the armature main plate and the armature driving portion are disposed at two radial ends of the armature mounting portion, respectively.

As shown in FIGS. 4-5, 7-8, and 11, the adjusting mechanism 2 also includes a bimetal adjusting structure 23, and the linkage rod 20 is capable of reciprocating along an axis direction of the linkage rod-main rod 200; the bimetal transmission rod 13 includes an adjusting slope 1320 disposed at its free end, and the bimetal cooperating arm 203 includes a bimetal cooperating arm driven portion which protrudes toward the adjusting slope 1320 and is in driving fit with the adjusting slope 1320; and the bimetal adjusting structure 23 drives the linkage rod 20 to move along the axis direction of the linkage rod-main rod 200, so that the bimetal cooperating arm driven portion moves relative to the adjusting slope 1320 to adjust a spacing between the bimetal cooperating arm driven portion and the adjusting slope 1320. Further, the adjustment slope 1320, from one end to the other end, inclines to the direction where the bimetal cooperating arm driven portion is located, and the linkage rod 20 drives the bimetal cooperating arm driven portion to move between two ends of the adjusting slope 1320.

As shown in FIGS. 4-5, 7-8, and 11, the bimetal adjusting structure 23 is a bimetal adjusting knob; the bimetal adjusting knob includes an adjusting knob main body and an adjusting knob toggling portion 232 disposed on a circumferential side wall of the adjusting knob main body; the bimetal adjusting knob is disposed rotatably around an axis of the adjusting knob main body; the linkage rod 20 further includes a linkage rod adjusting portion 205, and an adjusting portion slot in which the adjusting knob toggling portion 232 is inserted in is formed in the middle of the linkage rod adjusting portion 205; and the bimetal adjusting knob rotates, through the cooperation of the adjusting knob toggling portion 232 and the linkage rod adjusting portion 205, to drive the linkage rod 20 to move along the axis of the linkage rod-main rod 200. Specifically, as shown in FIG. 8, the bimetal adjustment knob rotates, through the cooperation of the adjusting knob toggling portion 232 and the linkage rod adjusting portion 205, to drive the linkage rod 20 to move along the linkage rod metal shaft 21.

Figure 11:
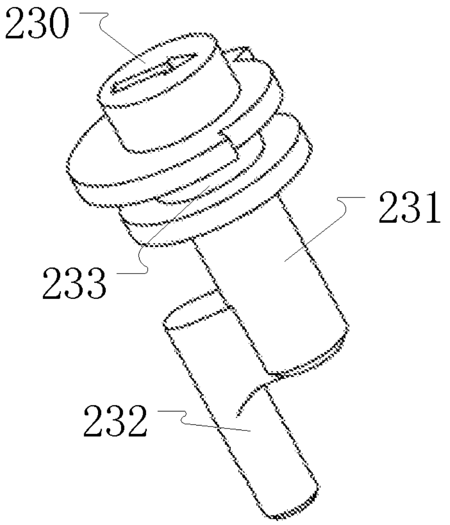
FIG. 11 is a schematic structural diagram of a bimetal adjusting structure of the present invention.

As shown in FIG. 11, an embodiment of the bimetal adjusting structure 23 is shown: the bimetal adjusting structure 23 is a bimetal adjusting knob; the bimetal adjusting knob includes an adjusting knob main body, and an adjusting knob toggling portion 232 disposed on a circumferential side wall of the adjusting knob main body; the adjusting knob main body includes an adjusting knob operating portion 230, an adjusting knob mounting portion and an adjusting knob connecting portion 231 which are connected in sequence; the adjusting knob mounting portion includes an annular adjusting knob clamping groove 233; the bimetal adjusting knob is rotatably clamped in the adjusting mechanism bracket 22 of the adjusting mechanism 2 through the adjusting knob clamping groove 233; and one end of the adjusting knob toggling portion 232 is connected to the circumferential side wall of the adjusting knob connecting portion 231, and the other end of the adjusting knob toggling portion 232 is inserted into an adjusting portion slot of the linkage rod adjusting portion 205.

As other embodiments, the bimetal adjusting structure 23 may also be slidably disposed on the adjusting mechanism bracket 22 of the adjusting mechanism 2, one end of the bimetal adjusting structure 23 toggles the linkage rod adjusting portion 205 while the bimetal adjusting structure 23 slides, and the linkage rod adjusting portion 205 drives the linkage rod 20 to move along the axis of the linkage rod-main rod 200.

Figure 13:
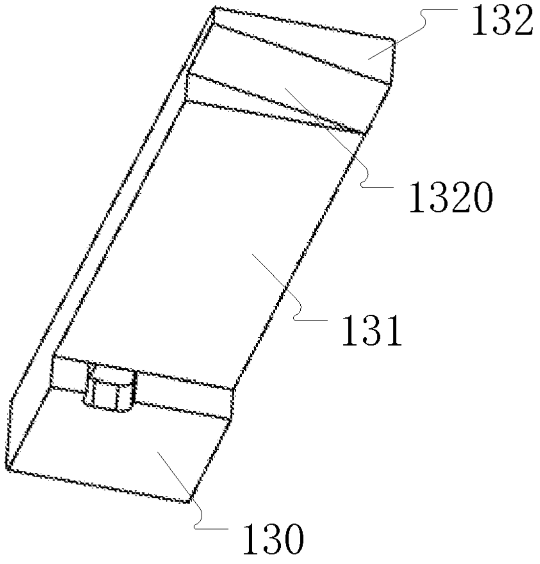
FIG. 13 is a schematic structural diagram of a bimetal transmission rod of the present invention.

As shown in FIG. 13, an embodiment of the bimetal transmission rod 13 is shown: the bimetal transmission rod 13 is of a, long rod-shaped structure, which includes a bimetal transmission rod connecting end 130, a bimetal transmission rod transition portion 131 and a bimetal transmission rod wedge portion 132 which are connected in sequence, wherein the bimetal transmission rod connecting portion 130 is inserted in the pole housing 31-32 and is connected to the second bimetal end of the bimetallic strip 12, and the bimetal transmission rod wedge portion 132 protrudes out of the pole housing 31-32 and includes the adjusting slope 1320.

As shown in FIGS. 4-6, the electromagnetic mechanism of the thermomagnetic tripping mechanism 1 further includes an armature spring 16, and the armature spring 16 cooperates with the armature 14 such that the armature 14 rotates away from the magnetic yoke 11; and the thermomagnetic tripping mechanism 1 further includes an adjusting screw 19 disposed on the pole housing 31-32, wherein one end of the adjusting screw 19 cooperates with the armature 14, and the adjusting screw 19 and the armature 14 are located on both sides of the armature 14 respectively. By screwing the adjusting screw 19, the armature 14 is driven to rotate close to the magnetic yoke 11. The armature spring 16 cooperates with the adjusting screw 19 in order to achieve a flexible adjustment of a magnetic gap between the armature 14 and the magnetic yoke 11.

As shown in FIGS. 4-6, and 8, the armature spring 16 is a torsion spring, which includes a spring acting end and a spring adjusting end 162; the adjusting mechanism 2 further includes a torque adjusting rod 25 and a torque adjusting operation rod 24; the torque adjusting rod 25 includes an adjusting rod main rod 250, and an adjusting rod force-bearing portion 253 and an adjusting rod force-applying arm 252 which are disposed on the adjusting rod main rod 250 respectively; the spring acting end cooperates with the armature 14; the spring adjusting end is in driving fit with the adjusting rod force-applying arm 252; the torque adjusting operation rod 24 is disposed rotatably around its own axis, and one end of the torque adjusting operation rod 24 is in driving fit with the adjusting rod force-bearing portion 253; the torque adjusting operation rod 24 rotates and drives the torque adjusting rod 25 to rotate through the adjusting rod force-bearing portion 253; and the torque adjusting rod 25 increases or decreases a force exerted by the torsion spring on the armature 14 through the adjusting rod force-applying arm 252, thereby adjusting a current gear of the circuit breaker. Further, the adjusting rod force-applying arm 252 passes through the pole housing 31-32 and then cooperates with the spring adjusting end, which is conductive to improving the insulativity of the circuit breaker. Further, the adjusting rod force-applying arm 252 passes through the adjusting end avoidance hole of the pole housing 31-32 and then cooperates with the spring adjusting end 162.

As shown in FIGS. 4-6, the armature spring 16 is a torsion spring which sleeves the armature shaft 15.

Figure 10:
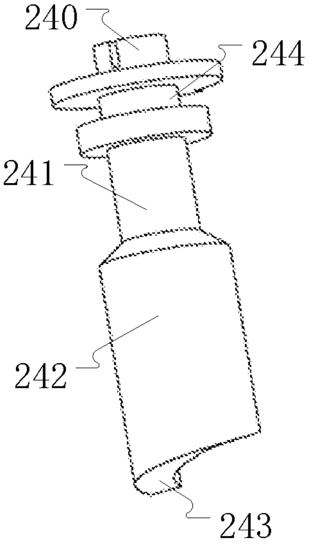
FIG. 10 is a schematic structural diagram of a torque adjusting rod of the present invention.

As shown in FIGS. 8 and 10, the adjusting rod force-bearing portion 253 is an adjusting rod force-bearing arm disposed on the adjusting rod main rod 250, the torque adjusting operation rod 24 includes an adjusting helical surface 243 disposed on one end thereof, and the adjusting helical surface 243 props against a free end of the adjusting rod force-bearing arm. Further, as shown in FIG. 10, the adjusting helical surface 243 is a continuously changing smooth curved surface.

As shown in FIG. 10, an embodiment of the torque adjusting operation rod 24 is shown: the torque adjusting operation rod 24 includes an operation rod operating portion 240, an operation rod mounting portion, an operation rod connecting portion 241 and an operation rod driving portion 242 which are connected in sequence, wherein the operation rod mounting portion is provided with an operation rod annular groove 244; the torque adjusting operation rod 24 is rotatably clamped in the adjusting mechanism bracket 22 of the adjusting mechanism 2 through the operation rod annular groove 244; and the adjusting helical surface 243 is provided at a free end of the operation rod driving portion 242. Further, an outer diameter of the operation rod connecting portion 241 is smaller than an outer diameter of the operation rod driving portion 242.

As other embodiments, one end of the torque adjusting operation rod 24 and the adjusting rod force-bearing portion 253 are implemented in the form of a worm gear. Alternatively, a bevel gear is disposed at one end of the torque adjusting operation rod 24, and the adjusting rod force-bearing portion 253 is mating teeth which are disposed along the circumferential direction of the adjusting rod main body 250.

As shown in FIG. 7 and FIG. 12, the pole housing 31-32 includes an adjusting rod cooperating groove formed on its outside, and the adjusting rod main rod 250 is disposed rotatably in the adjusting rod cooperating groove. Further, as shown in FIG. 7, the adjusting rod cooperating groove is formed by connecting a first section of cooperating groove 317 formed on the first half pole housing 31 and a second section of cooperating groove 327 formed on the second half pole housing 32, respectively.

As shown in FIGS. 4-5, an embodiment of the armature spring 16 is shown: the armature spring 16 is a double torsion spring, which includes two spiral bodies arranged coaxially, parallel ends located in the middles of the two spiral bodies and connected to the two spiral bodies respectively, and two spring adjusting ends 162 respectively disposed at both ends of the double torsion spring and connected to the two spiral bodies respectively; and each parallel end is a torsion spring acting end which cooperates with the armature 14. Further, as shown in FIG. 7, the pole housing 31-32 includes adjusting end avoidance holes which correspond to the two spring adjusting ends 162, respectively; the two adjusting end avoidance holes, which are a first adjusting end avoidance hole 316 and a second adjusting end avoidance hole 326 respectively and are formed in the first half pole housing 31 and the second half pole housing 32 of the pole housing 31-32 respectively; and the two adjusting end avoidance holes are located on both sides of the bimetal transmission rod 13.

As shown in FIG. 9, a torque adjusting rod shaft 251 is respectively disposed on both ends of the torque adjusting rod main rod 250, and the torque adjusting rod shafts 251 are disposed rotatably on the adjusting mechanism bracket 22 of the adjusting mechanism 2 respectively.

As shown in FIGS. 4-5, and 8-9, the adjusting mechanism 2 also includes an adjusting mechanism bracket 22; the linkage rod 20 and the torque adjusting rod 25, of the adjusting mechanism 2, are disposed rotatably on the adjusting mechanism bracket 22 respectively; the linkage rod 20 and the torque adjusting rod 25 are spaced in parallel; the bimetal adjusting structure 23 and the torque adjusting operation rod 24, of the adjusting mechanism 2, are disposed on the adjusting mechanism bracket 22 respectively; an axial direction of the bimetal adjusting structure 23 and an axial direction of the torque adjusting operation rod 24 are perpendicular to an axial direction of the linkage rod 20 and the torque adjusting rod 25, respectively; and the intermediate transmission rod 26 of the adjusting mechanism 2 is also disposed rotatably on the adjusting mechanism bracket 22, and the intermediate transmission rod 26 and the operating mechanism 100 are located on the same side of the adjusting mechanism bracket 22.

As shown in FIGS. 4-5, and 8-9, an embodiment of the adjusting mechanism bracket 22 is shown: the adjustment mechanism bracket 22 includes a pair of bracket side plates, a bracket top plate and a bracket partition plate, wherein the linkage rod 20 and the torque adjusting rod 25 are located between the two bracket side plates; the linkage rod 20 is disposed rotatably on the two bracket side plates through the linkage rod metal shaft 21; two ends of the torque adjusting rod 25 are disposed rotatably on the two bracket side plates, respectively; the bracket top plate is opposite to respective circuit breaker poles 300; the bimetal adjusting structure 23 and the torque adjusting operation rod 24 are both disposed on the bracket top plate; the bracket partition plate is connected to the bracket side plate and the bracket top plate respectively; the linkage rod 20, the torque adjusting rod 25, the bimetal adjusting structure 23 and the torque adjusting structure 24 are located on one side of the bracket partition plate; and the intermediate transmission rod 26 and the operating mechanism 100 are located on the other side of the bracket partition plate.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

The invention claimed is:

1. A circuit breaker, comprising a plurality of circuit breaker poles arranged side by side, an operating mechanism and a tripping system, wherein each of the circuit breaker poles, comprises a pole housing and a contact system disposed in the pole housing, and the contact system comprises a moving contact mechanism which is disposed rotatably and a static contact which cooperates with the moving contact mechanism; the operating mechanism is disposed outside respective circuit breaker poles and is in driving connection to the moving contact mechanism of each circuit breaker pole; the tripping system comprises a plurality of groups of tripping mechanisms and an adjusting mechanism; each group of tripping mechanism comprises a conductive plate, as well as a magnetic yoke and an armature which are used cooperatively, wherein the conductive plate passes through the middle of the magnetic yoke; each circuit breaker pole is provided with a group of tripping mechanism therein, and the contact system of each circuit breaker pole is electrically connected to the corresponding conductive plate; the adjusting mechanism comprises a linkage rod which is disposed rotatably around its own axis; and each group of tripping mechanism further comprises an insulated transmission rod which is disposed rotatably, wherein one end of the insulated transmission rod is inserted into the pole housing and is in driving fit with the armature, and another end of the insulated transmission rod protrudes out of the pole housing and is in driving fit with the operating mechanism through the linkage rod to drive the operating mechanism to trip.

2. The circuit breaker according to claim 1, wherein each group of the tripping mechanism further comprises a bimetallic strip and a bimetal transmission rod; two ends of the bimetallic strip are a first bimetal end and a second bimetal end, respectively; the first bimetal end is electrically connected to the conductive plate, and the second bimetal end is connected to one end of the bimetal transmission rod; and another end of the bimetal transmission rod passes through the pole housing and is then in driving fit with the operating mechanism through the linkage rod to drive the operating mechanism to trip.

3. The circuit breaker according to claim 1, wherein the adjusting mechanism further comprises a linkage rod metal shaft, wherein a linkage rod shaft hole which extends in an axial direction of the linkage rod is formed in the middle of the linkage rod, the linkage rod metal shaft is inserted in the linkage rod shaft hole, and the linkage rod is disposed rotatably through the linkage rod metal shaft.

4. The circuit breaker according to claim 2, wherein the linkage rod comprises a linkage rod-main rod which rotates around its own axis, as well as a bimetal cooperating arm, an armature cooperating arm and a linkage rod transmission arm which are respectively disposed on the linkage rod-main rod, wherein one ends of the insulated transmission rod and the bimetal transmission rod, which protrude out of the pole housing, cooperate with the armature cooperating arm and the bimetal cooperating arm respectively to drive the linkage rod to rotate; and the linkage rod is in driving fit with the operating mechanism through the linkage rod transmission arm to drive the operating mechanism to trip.

5. The circuit breaker according to claim 4, wherein the adjusting mechanism also comprises a bimetal adjusting structure, and the linkage rod is capable of reciprocating along an axis direction of the linkage rod-main rod; the bimetal transmission rod comprises an adjusting slope disposed at its free end, and the bimetal cooperating arm comprises a bimetal cooperating arm driven portion which protrudes toward the adjusting slope and is in driving fit with the adjusting slope; and the bimetal adjusting structure drives the linkage rod to move along the axis direction of the linkage rod-main rod, so that the bimetal cooperating arm driven portion moves relative to the adjusting slope to adjust a spacing between the bimetal cooperating arm driven portion and the adjusting slope.

6. The circuit breaker according to claim 5, wherein the bimetal adjusting structure is a bimetal adjusting knob; the bimetal adjusting knob comprises an adjusting knob main body and an adjusting knob toggling portion disposed on a circumferential side wall of the adjusting knob main body; the bimetal adjusting knob is disposed rotatably around its axis of the adjusting knob main body; the linkage rod further comprises a linkage rod adjusting portion, and an adjusting portion slot in which the adjusting knob toggling portion is inserted is formed in the middle of the linkage rod adjusting portion; and the bimetal adjusting knob rotates, through the cooperation of the adjusting knob toggling portion and the linkage rod adjusting portion, to drive the linkage rod to move along the axis of the linkage rod-main rod; and the bimetal transmission rod is of a long rod-shaped structure, which comprises a bimetal transmission rod connecting end, a bimetal transmission rod transition part and a bimetal transmission rod wedge portion which are connected in sequence, wherein the bimetal transmission rod connecting end is inserted in the pole housing and is connected to the second bimetal end, and the bimetal transmission rod wedge portion protrudes out of the pole housing and comprises the adjusting slope.

7. The circuit breaker according to claim 1, wherein each group of tripping mechanism further comprises an armature spring, and the armature spring cooperates with the armature such that the armature rotates away from the magnetic yoke; and the tripping mechanism further comprises an adjusting screw disposed on the pole housing, wherein one end of the adjusting screw cooperates with the armature, and the armature is driven by screwing the adjusting screw to rotate in a direction close to the magnetic yoke.

8. The circuit breaker according to claim 7, wherein the armature spring is a torsion spring, which comprises a spring acting end and a spring adjusting end; the adjusting mechanism further comprises a torque adjusting rod and a torque adjusting operation rod; the torque adjusting rod comprises an adjusting rod main rod, and an adjusting rod force-bearing portion and an adjusting rod force-applying arm which are disposed on the adjusting rod main rod respectively; the adjusting rod force-applying arm is in driving fit with another end of the torsion spring; the torque adjusting operation rod is disposed rotatably around its own axis, and one end of the torque adjusting operation rod is in driving fit with the adjusting rod force-bearing portion; the torque adjusting operation rod rotates, through the adjusting rod force-bearing portion, to drive the torque adjusting rod to rotate; and the torque adjusting rod increases or decreases a force exerted by the torsion spring on the armature through the adjusting rod force-applying arm.

9. The circuit breaker according to claim 8, wherein the adjusting rod force-applying arm passes through the pole housing and then cooperates with the spring adjusting end.

10. The circuit breaker according to claim 8, wherein the adjusting rod force-bearing portion is an adjusting rod force-bearing arm disposed on the adjusting rod main rod, and the torque adjusting rod comprises an adjusting helical surface disposed on one end thereof, and the adjusting helical surface props against a free end of the adjustment rod force-bearing arm; and the pole housing comprises an adjusting rod cooperating groove formed on its outside, and the adjusting rod main rod is disposed rotatably in the adjusting rod cooperating groove.

11. The circuit breaker according to claim 7, wherein the tripping mechanism further comprises an armature shaft, a middle of the armature rotates around the armature shaft, one end of the armature cooperates with the magnetic yoke, and another end of the armature cooperates with the insulated transmission rod; and the armature spring is a torsion spring which sleeves the armature shaft.

12. The circuit breaker according to claim 1, wherein the insulated transmission rod comprises a transmission rod connecting arm, a transmission rod cooperating plate, a transmission rod mounting portion and a transmission rod force-bearing arm which are connected in sequence; a middle of the transmission rod mounting portion is disposed rotatably on the pole housing through an insulated transmission rod shaft the transmission rod force-bearing arm is in driving fit with the armature; and the transmission rod cooperating plate is in driving fit with an armature cooperating arm of the linkage rod.

13. The circuit breaker according to claim 12, wherein a dimension of the transmission rod cooperating plate in an axial direction of a linkage rod-main rod of the linkage rod is greater than that of the armature cooperating arm of the linkage rod in the axial direction of the linkage rod-main rod.

14. The circuit breaker according to claim 13, wherein the armature comprises an armature main plate which is opposite to and cooperates with the magnetic yoke, and an armature mounting portion which is disposed rotatably on the pole housing through a armature shaft and an armature driving portion; the armature driving portion comprises an armature driving finger extending toward the insulated transmission rod; the transmission rod force-bearing arm comprises a transmission rod driven hole; and the armature driving finger is rotatably inserted in the transmission rod driven hole.

15. The circuit breaker according to claim 1, wherein the adjusting mechanism also comprises an intermediate transmission rod which is disposed rotatably; the linkage rod transmission arm is in driving fit with one end of the intermediate transmission rod, and another end of the intermediate transmission rod cooperates with the operating mechanism; and the adjusting mechanism also comprises an adjusting mechanism bracket; the linkage rod and a torque adjusting rod, of the adjusting mechanism, are disposed rotatably on the adjusting mechanism bracket respectively; the linkage rod and a torque adjusting rod are spaced in parallel; a bimetal adjusting structure and a torque adjusting operation, of the adjusting mechanism, are disposed on the adjusting mechanism brackets, respectively; an axial direction of the bimetal adjusting structure and an axial direction of the torque adjusting operation rod are perpendicular to an axial direction of the linkage rod and the torque adjusting rod, respectively; and the intermediate transmission rod of the adjusting mechanism is rotatably disposed on the adjusting mechanism bracket-%, and the intermediate transmission rod and the operating mechanism are located on the same side of the adjusting mechanism bracket.

* * * * *